Nov. 18, 1969  R. L. LAUTZENHISER ET AL  3,478,995
TIE-DOWN APPARATUS
Filed Sept. 21, 1967
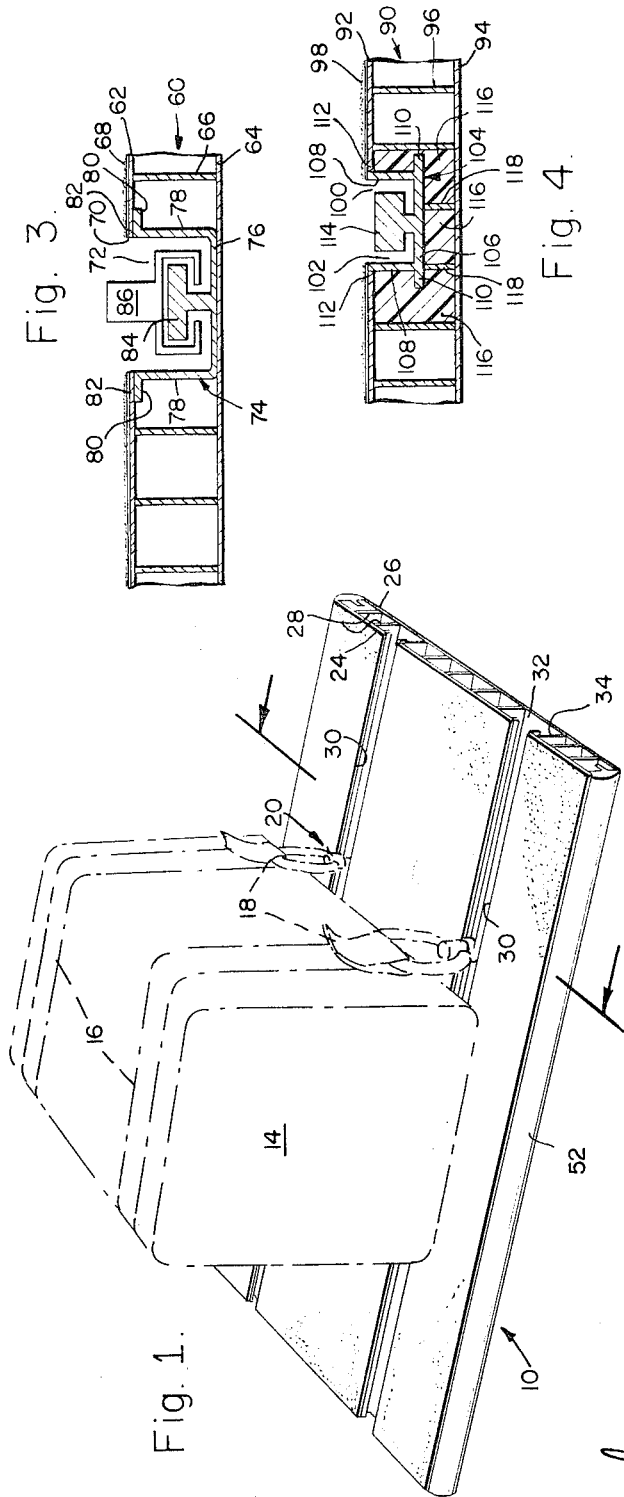
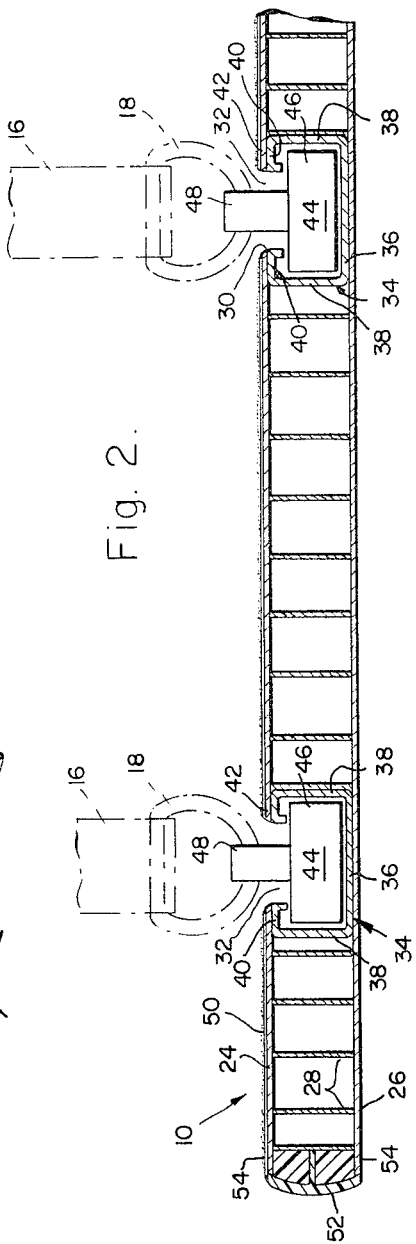
Robert L. Lautzenhiser,
James D. Michel,
INVENTORS.
BY.
ATTORNEY.

United States Patent Office 3,478,995
Patented Nov. 18, 1969

3,478,995
TIE-DOWN APPARATUS
Robert L. Lautzenhiser, Los Angeles, and James D. Michel, Torrance, Calif., assignors to Hughes Aircraft Company, Culver City, Calif., a corporation of Delaware
Filed Sept. 21, 1967, Ser. No. 669,446
Int. Cl. B61d *45/00*
U.S. Cl. 248—361                12 Claims

ABSTRACT OF THE DISCLOSURE

A tie-down apparatus includes a honeycomb panel in which a tie-down channel is secured to the upper and lower plates and the honeycomb structure and cooperates with a male or female attachment and straps for tying down electronic equipment, containers for goods, machinery and the like.

---

The present invention relates to a tie-down apparatus and, in particular, to such an apparatus having a tie-down channel integrally bonded to a honeycomb structure within a honeycomb panel.

Many equipment carriers are made mobile so that the equipment carried thereby may be transported easily from site to site as, for example, for serving or outdoor installations and for military operations. At the same time, such carriers must be capable of carrying a variety of equipment which may be easily removed and exchanged with other equipment in order to tailor the use of the carrier to the particular servicing need. To achieve such mobility and exchange of equipment, it is often mandatory that the carrier be as light as possible and that a minimum of damage occur to the mobile equipment. Therefore, the entire facility which houses and supports such equipment must have maximum strength with minimum weight and must be provided with a means by which the equipment can be securely tied to the carrier yet be easily removed and replaced. While great strides have been made to decrease the weight of instrumentation and working parts of the equipment, the means by which such equipment is housed, supported and secured has not kept pace with the design of the equipment.

There are other cases where equipment must be secured to the structure, such as to walls, floors, ceilings and shelves, of a carrier, whether stationary or mobile wherein the structure comprises honeycomb material. It has not heretofore been possible to secure equipment to honeycomb panels.

The present invention, therefore, is directed to provide a structure having great strength and weight for supporting and securing equipment. Briefly, the present invention comprises a honeycomb panel into which one or more channels are permanently formed and bonded to the honeycomb structure of the panel. The channels have portions so that an attachment may be placed within the channel and held therein for tieing down equipment regardless of the particular shape or size of the equipment.

It is, therefore, an object of the present invention to provide a high strength, low weight tie-down panel.

Other aims and objects, as well as a more complete understanding of the present invention, will appear from the following explanation of exemplary embodiments and the accompanying drawings thereof, in which:

FIG. 1 is a perspective view of a tie-down panel supporting and fixedly securing equipment;

FIG. 2 is a sectional view of the panel taken along lines 2—2 of FIG. 1; and

FIGS. 3 and 4 are partial sectional views of modifications of the panel depicted in FIGS. 1 and 2.

Accordingly, a tie-down panel 10 comprises a shelf or a section of a shelf, a floor, a ceiling or a wall. An apparatus 14, which may comprise an oscilloscope, a vacuum tube voltmeter, or a container for goods, is securely held onto panel 10 by means of straps 16, attachments 18, and a tie-down mechanism 20. It is to be understood, however, that straps 16 and attachments 18 may take other well-known shapes. The attachments may comprise rings, buckles, etc., as is well-known.

Panel 10 comprises an upper plate 24, a lower plate 26, and a honeycomb structure 28. The honeycomb structure is secured to the upper and lower plates by any suitable means, such as by epoxy resin. Elongated slots 30 are formed in panel 10 to provide openings 32 in plate 24 and structure 28. U-shaped channels 34 are placed within openings 32 and are bonded within the honeycomb panel such as by welding and/or epoxy resins. Channels 34 comprise a bottom wall 36, side walls 38 and top walls or lips 40. Bottom wall 36 is secured to lower plate 26 by welding or other suitable means and side walls 38 are angled from the bottom wall and extend toward upper plate 24. Top walls 40 are angled with respect to the side walls and extend toward each other. Plate 24 overlaps channel 34 to provide edges 42 so that top walls 40 may be bonded to edges 42. Therefore, maximum strength and rigidity is provided by an integral connection between bottom wall 36 and lower plate 26 and between top walls 40 and upper plate 24.

A nut 44 is provided within channel 34 to provide a securing means between attachments 18 and panel 10. Each nut comprises a base 46 which has a width greater than that of the opening between edges 42 and between top walls 40 so that base 46 of nut 44 lies between bottom wall 36 and top walls 40 of channels 34. An extension 48 is affixed to base 46 and extends through opening 32 so that attachments 18 may be secured thereto.

The panel is finished with a roughened surface 50 which may comprise an adhesive so that apparatus 14, in conjunction with straps 16, attachments 18 and tie-down mechanism 20, will be frictionally held on panel 10. A pair of pieces 52 are secured to edges 54 of panel 10 in order to provide the panel with a finished appearance. However, edges 54 may comprise an interlocking mechanism so that panel 10 may interlock with an adjoining panel to form a complete wall, ceiling, etc. or a wider shelf.

Referring now to FIG. 3 which depicts a further embodiment of the present invention, a panel 60 comprises an upper plate 62, a lower plate 64, and a honeycomb structure 66 bonded to upper and lower plates 62 and 64 by, for example, an epoxy resin. A roughened surface 68 may be adhered to upper plate 62 to provide a friction surface.

An elongated slot 70 is formed within panel 60 extending through plate 62 and honeycomb structure 66 to provide an opening 72 therein. A U-shaped channel 74 is secured within the panel and is provided with a bottom wall 76, side walls 78, and top walls or lips 80. The lips underlie edges 82 of plate 62 and are bonded thereto by a resin or welding.

A T-shaped member 84 is formed integrally with channel 74 to provide a male attachment for a female attachment means 86. An attachment, such as strap 16 of FIG. 1, is secured to member 86 for securement of an apparatus 14 to panel 60.

A further modification of the present invention is depicted in FIG. 4 and comprises a panel 90 provided with an upper plate 92, a lower plate 94, a honeycomb structure 96, and a roughened surface 98. An elongated slot 100 is formed in plate 92 and partially through structure 96 to provide an opening 102 in panel 90. A U-shaped channel 104 having a bottom wall 106, side walls 108, and extensions 110 on bottom wall 106, is placed within opening 102 for attachment of an apparatus 14 to panel 90. The upper part of side walls 108 are affixed to a pair of edges 112 of upper plate 92 by bonding or welding. A T-shaped member 114 is integral with channel 104; however, channel 104 may be formed similar to channel 34 of FIGS. 1 and 2.

The U-shaped channel of FIG. 4 is bonded to panel 90 by means of an epoxy resin 116 so that strong joints may be made among side walls 108 and bottom wall 106 with upper plate 96, lower plate 94, and honeycomb structure 96. If desired, the bottom portion of wall 106 may be secured to the uppermost portion of elements 118 of honeycomb structure 96 rather than by thoroughly impregnating the honeycomb structure underlying bottom wall 106. Extensions 110 of wall 106 enable a strong bond and interlocking feature to be made to enhance the rigidity of the channel within the panel.

Although the invention has been described with reference to particular embodiments thereof, it should be realized that various changes and modifications may be made therein without departing from the spirit and scope of the invention.

What is claimed is:
1. In a tie-down device:
   a honeycomb panel including an upper plate, a lower plate, and a honeycomb structure placed between and bonded to said plates;
   an elongated tie-down mechanism having means opening through one of said plates; and
   means affixing said mechanism at least to said honeycomb structure and between said upper and lower plates.
2. A device as in claim 1 wherein said mechanism comprises a U-shaped channel having a bottom wall and side walls secured to said bottom wall and extending toward said upper plate, said side walls bonded to said honeycomb structure by said affixing means.
3. A device as in claim 2 further including top walls secured to said side walls and extending toward each other and edges terminating said upper plate and overlapping said channel, said affixing means further bonding said top walls to said edges.
4. A device as in claim 2 further including top walls secured to said side walls and extending away from each other and edges terminating said upper plate and bonded by said affixing means to said top walls.
5. A device as in claim 2 wherein said bottom wall is secured to said honeycomb structure by said affixing means.
6. A device as in claim 5 further including extensions formed on said bottom wall and extending therefrom and said affixing means secured about said extensions and within said honeycomb structure to further secure said channel witihn said panel.
7. A device as in claim 3 further comprising a nut having a base disposed within said channel between said bottom wall and said top walls and having attachment means secured to said base and extending through said top walls.
8. A device as in claim 2 further including male attachment means formed on said channel.
9. A device as in claim 2 further including female attachment means formed in said channel.
10. A device as in claim 2 wherein said bottom wall is directly affixed to said lower plate.
11. In a tie-down device, the combination of a panel and an elongated U-shaped channel:
   said panel comprising an upper plate, a lower plate, and a honeycomb structure bonded to said plates, said panel having at least one elongated slot means therein to provide opening means in said honeycomb structure and said upper plate, and
   said elongated U-shaped channel having a bottom wall, a pair of short top walls, and a pair of side walls secured to said bottom wall and said top walls, said bottom wall affixed to said lower plate, said side walls affixed to said honeycomb structure and said top walls secured to said upper plate.
12. A tie-down device as in claim 11 comprising a nut having a base disposed within said channel between said bottom wall and said top walls and having attachment means secured to said base and extending out of said slot means.

References Cited
UNITED STATES PATENTS

| | | | |
|---|---|---|---|
| 2,052,914 | 9/1936 | Williams | 248—119 X |
| 2,584,762 | 2/1952 | Vossenberg | 108—52 X |
| 2,735,377 | 2/1956 | Elsner | 105—369 |
| 2,432,295 | 12/1947 | Donahue | 108—52 |

CHANCELLOR E. HARRIS, Primary Examiner

J. PETO, Assistant Examiner

U.S. Cl. X.R.

105—368, 369; 108—55